(12) United States Patent
Oda et al.

(10) Patent No.: US 6,246,425 B1
(45) Date of Patent: Jun. 12, 2001

(54) OPTICAL SCANNING DEVICE AND IMAGE-FORMING APPARATUS

(75) Inventors: Ayumu Oda, Nara; Toshio Yamanaka, Yao; Masanobu Yamamoto, Nara; Norio Tomita; Nobuo Manabe, both of Yamatokoriyama, all of (JP)

(73) Assignees: Sharp Kabushiki Kaisha, Osaka (JP); Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/542,958

(22) Filed: Apr. 3, 2000

(30) Foreign Application Priority Data

Apr. 5, 1999 (JP) ................................. 11-097127
Apr. 5, 1999 (JP) ................................. 11-097131

(51) Int. Cl.[7] .............................. B41J 2/385; G03G 13/04
(52) U.S. Cl. ......................... 347/138; 347/242; 347/257; 347/263
(58) Field of Search .................................. 347/118, 134, 347/138, 152, 232, 233, 241, 242, 243, 245, 256, 257, 260, 261, 263

(56) References Cited

U.S. PATENT DOCUMENTS

| | | | |
|---|---|---|---|
| 5,294,943 | * | 3/1994 | Blanding et al. .................. 347/257 |
| 5,450,119 | * | 9/1995 | Hinton et al. .................... 347/242 |
| 5,539,447 | * | 7/1996 | Akuta et al. ..................... 347/263 |
| 5,675,431 | * | 10/1997 | Bock ............................ 347/134 X |
| 5,724,087 | * | 3/1998 | Sugano et al. ................... 347/243 |
| 5,825,522 | * | 10/1998 | Takano et al. ................. 347/233 X |
| 5,841,566 | * | 11/1998 | Minakuchi et al. ............. 347/233 X |
| 5,867,299 | * | 2/1999 | Takano et al. ................. 347/243 X |

FOREIGN PATENT DOCUMENTS

| | | |
|---|---|---|
| 63301074 | 12/1988 | (JP) . |
| 7128603 | 5/1995 | (JP) . |

\* cited by examiner

Primary Examiner—Sandra Brase
(74) Attorney, Agent, or Firm—Renner, Otto, Boisselle & Sklar

(57) ABSTRACT

In an optical scanning device for forming an electrostatic latent image on an image-bearing body with scanning beam released from a light source, a support body having a plurality of supporting faces and first and second optical means for directing the scanning beam from the light source onto the image-bearing body are installed. Moreover, in the support body, a light transmitting means for transmitting the scanning beam from the first optical means to the second optical means is installed in the vicinity of a ridge portion thereof that is the least susceptible to deformation and distortion and strongest in its strength. Thus, it becomes possible to improve a light image in its precision that is formed by the scanning beam directed onto the image-bearing body.

24 Claims, 11 Drawing Sheets

F R

OPTICAL SCANNING DEVICE AND IMAGE-FORMING APPARATUS

FIELD OF THE INVENTION

The present invention relates to an optical scanning device for forming an electrostatic latent image on an image-bearing body of an image-forming apparatus by using scanning beam released from a light source, and also concerns an image-forming apparatus using such an optical scanning device.

BACKGROUND OF THE INVENTION

In recent years, with respect to image-forming apparatuses for outputting high quality images, digital copying machines, laser printers and other apparatuses have been put on the market, and have been widely used. Such digital copying machines and laser printers are equipped with optical scanning devices for carrying out laser optical scan recording processes. The laser optical scan recording process is based on an image-recording system for forming an electrostatic latent image on an image-bearing body by using a scanning beam beam released from a light source.

Such an optical scanning device in an image-forming apparatus is provided with a laser light source for successively emitting a light image modulated based upon image information and various optical members for allowing the light image released from the laser light source to be focused on the image-bearing body so as to form an image, and these members are placed with a predetermined positional relationship being maintained with each other.

Moreover, in the recent office environment, with respect to the digital copying machine and the laser printer, there have been demands for miniaturization so as to reduce the installation space to a minimum. Along with the miniaturization of the image-forming apparatuses, the optical scanning device for carrying out a laser optical scan recording process has come to be placed in a limited space in a positional relationship with other constituent parts inside the image-forming apparatus.

For this reason, in order to keep the optical scanning device from interfering with installations of other constituent parts in the image-forming apparatus, an arrangement has been proposed in which the light path of the laser light from the laser light source to the surface of the image bearing body is reflected by a mirror so as to be bent.

For example, Japanese Laid-Open Patent Application No. 301074/1988 (Tokukaihei 63-301074 (published on Dec. 8, 1988) ) discloses a laser printer optical system explained as follows: In this laser printer system, the light path of the laser light is bent by installing three mirrors. This arrangement makes it possible to secure the light path length within a limited space, and consequently to miniaturize the optical scanning device.

Moreover, Japanese Laid-Open Patent Application No. 128603 (Tokukaihei 7-128603 (published on May, 19, 1995)) discloses a digital color copying machine having the following arrangement: In this digital copying machine, a plurality of optical scanning devices are aligned in parallel with each other. Then, in order to minimize the distance between the optical scanning devices aligned in parallel with each other, the optical scanning devices are placed longitudinally.

In general, the optical scanning device for carrying out a laser optical scan recording process is provided with a deflection device constituted by a polygon mirror and a driving motor for the polygon mirror so as to deflect the laser beam. The deflection device of this type is designed to rotate the polygon mirror at high speeds. Here, since a great load is applied to the rotary shaft of the driving motor, problems with this arrangement are that the service life of the driving motor is shortened and that looseness of the rotary shaft tends to give adverse effects on recording images.

Therefore, in particular, in the arrangement as disclosed in the above-mentioned Japanese Laid-Open Patent Application No. 128603 (Tokukaihei 7-128603) wherein the optical scanning devices are placed longitudinally, that is, the rotary shaft of the driving motor is placed horizontally with respect to the optical scanning device main body, since the load applied to the driving motor becomes extremely great, the above-mentioned problems are more likely to occur.

Moreover, in the arrangement as disclosed in the above-mentioned Japanese Laid-Open Patent Application No. 301074/1988 (Tokukaihei 63-301074) wherein the rotary shaft of the driving motor in the deflection device is placed vertically to the optical scanning device main body with the laser light path from the light source is placed in a bent state, the following problems arise. That is, in the case when a plurality of the light scanning devices having the above-mentioned arrangement are aligned and placed, the optical scanning device itself becomes bulky, and the distance between the light scanning devices also becomes longer, failing to miniaturize the image-forming apparatus.

In particular, in the recent tandem-type image-forming apparatus having the optical scanning device and the photosensitive body aligned in parallel with each other, in order to reduce the installation area of the image-forming apparatus to a minimum, an arrangement is adopted in which small-size image-forming sections, which use a photosensitive body of 30 to 40 mm in diameter based on the electrophotographing process, are aligned in parallel with each other. Even if the small-size image-forming section is adopted in this manner, it is not possible to minimize the size of the image-forming apparatus itself, unless the size of the optical scanning device itself is made smaller.

Moreover, in the optical scanning device, each reflection mirror serving as an optical member for directing a laser beam from the light source to the surface of an image-bearing body is supported on a side face or the like of a support body by means of a securing member. However, due to distortion in the support body caused by insufficient strength of the support body, it tends to become difficult to accurately maintain the positional precision of the reflection mirror, causing an offset in the laser beam light path, with the result that it becomes difficult to form an electrostatic latent image accurately on the image-bearing body based upon image information.

SUMMARY OF THE INVENTION

The objective of the present invention is described as follows: That is, in an optical scanning deice for carrying out a laser optical scan recording process and an image-forming apparatus, it is to provide an optical scanning device and an image-forming apparatus that can output images with superior image quality by improving the positional precision of an optical member for directing the scanning beam from the light source to the surface of an image-bearing body.

In order to achieve the above-mentioned objective, the optical scanning device of the present invention, which forms an electrostatic latent image on an image-bearing body with scanning beam released from a light source, is provided with:

a support body having a plurality of supporting faces;

first and second optical means for directing the scanning beam from the light source onto the image-bearing body, the first optical means being installed on a first supporting face of the support body, the second optical means being installed on a second supporting face adjacent to the first supporting face; and light transmitting means for transmitting the scanning beam from the first optical means to the second optical means, installed in the vicinity of a ridge portion between the first supporting face and the second supporting face.

In the above-mentioned arrangement, the light transmitting means, which transmits a scanning beam from the first optical means to the second optical means, is installed in the vicinity of a ridge portion between the first supporting face and the second supporting face of the support body having a plurality of supporting faces. In general, in the support body having a plurality of supporting faces, the proximity of a ridge portion between the supporting faces is a portion that is strong in strength, and is less susceptible to deformation and distortion. Since the light transmitting means for transmitting a scanning beam from the first optical means to the second optical means is installed on the portion that is less susceptible to deformation and distortion, it is possible to reduce the positional offset of the scanning beam that is directed from the first optical means to the second optical means. Therefore, it becomes possible to improve the precision of a light image derived from the scanning beam that is projected onto the image-bearing body, and consequently to output images with high image quality.

Moreover, in order to achieve the above-mentioned objectives, the image-forming apparatus of the present invention, which outputs an image onto an image output medium by means of a laser optical scan recording process, is provided with:

an optical scanning device for forming an electrostatic latent image on an image-bearing body with scanning beam released from a light source; and a developing device for carrying out a developing process on the image output medium based upon the electrostatic latent image formed on the optical scanning device, said optical scanning device comprising:

a support body having a plurality of supporting faces;

first and second optical means for directing the scanning beam from the light source onto the image-bearing body, the first optical means being installed on a first supporting face of the support body, the second optical means being installed on a second supporting face adjacent to the first supporting face; and light transmitting means for transmitting the scanning beam from the first optical means to the second optical means, installed in the vicinity of a ridge portion between the first supporting face and the second supporting face.

In the above-mentioned arrangement, based upon an electrostatic latent image formed by the optical scanning device, an image is outputted by the developing device onto an image output medium. Here, in the optical scanning device, the light transmitting means, which transmits a scanning beam from the first optical means to the second optical means, is installed in the vicinity of a ridge portion between the first supporting face and the second supporting face of the support body having a plurality of supporting faces. As described above, in the support body having a plurality of supporting faces, the proximity of a ridge portion between the supporting faces is a portion that is strong in strength, and is less susceptible to deformation and distortion. Since the light transmitting means for transmitting a scanning beam from the first optical means to the second optical means is installed on the portion that is less susceptible to deformation and distortion, it is possible to reduce the positional offset of the scanning beam that is directed from the first optical means to the second optical means. Therefore, it becomes possible to improve the precision of a light image derived from the scanning beam that is projected onto the image-bearing body, and consequently to output images with high image quality onto an image output medium.

For a fuller understanding of the nature and advantages of the invention, reference should be made to the ensuing detailed description taken in conjunction with the accompanying drawings.

DESCRIPTION OF THE EMBODIMENTS

[EMBODIMENT 1]

Referring to Figures, the following description will discuss one embodiment of the present invention.

Figure 1:
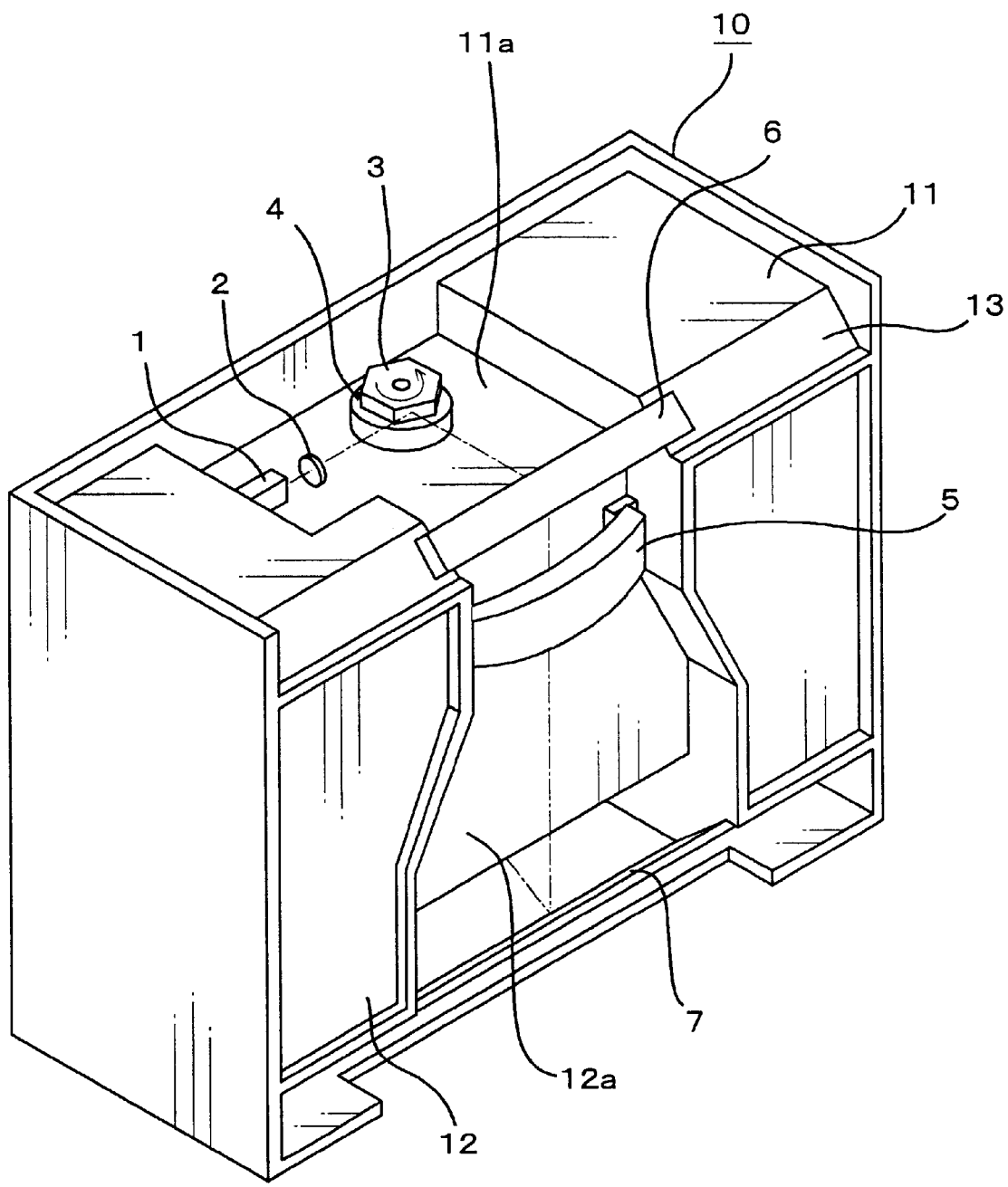
FIG. 1 is a perspective view that schematically shows a structural example of a laser scanning device in accordance with one embodiment of the present invention.

FIG. 1 is a perspective view that shows a schematic construction of a laser scanning device (optical scanning device) in accordance with the present invention. This laser scanning device is constituted by a semiconductor laser light source 1, a collimator lens 2, a polygon mirror 3, a driving motor 4, an fθ lens 5, a first reflection mirror 6 and a second reflection mirror 7, and these members are supported by a main-body frame 10.

For example, when applied to a digital color copying machine, the semiconductor laser light source 1 outputs a laser beam in accordance with image data that has been read by a scanner unit, not shown, and stored in a memory, and when applied to a laser printer, it outputs a laser beam in accordance with image data that has been transferred from an external terminal device.

The collimator lens 2 is a lens used for converting the modulated laser beam outputted from the semiconductor laser light source 1 into parallel laser light rays.

The polygon mirror 3 deflects the laser beam from the collimator lens 2 in a predetermined direction with a constant angular velocity. The driving motor 4 is used for rotatively driving the polygon mirror 3. The polygon mirror 3 and the driving motor 4 constitute a deflection device that serves as a first optical member.

The fθ lens 5 serving as a second optical member corrects the laser beam that has been deflected with a constant angular velocity by the polygon mirror 3 so as to allow the resulting light beam to scan a photosensitive drum with a constant velocity, not shown, and to form a electrostatic latent image without distortion. Here, the above-mentioned photosensitive drum functions as an image-bearing body constituting an electrophotographing process section.

The first reflection mirror 6 is a mirror for directing the laser beam deflected and reflected by the polygon mirror 3 to the fθ lens 5. The second reflection mirror 7 is one of a group of mirrors that reflect and direct the laser beam from the fθ lens 5 onto the photosensitive drum.

The main-body frame 10, which has a virtually rectangular parallelopiped (polyhedron) shape, is provided with a horizontal upper face (first supporting face) 11 and a vertical side face (second supporting face) 12 that is adjacent to the horizontal upper face 11.

A recessed section is formed in the virtually center of the horizontal upper face 11, and a deflection device, which is constituted by the semiconductor laser light source 1, the polygon mirror 2 and the driving motor 3, is supported on the bottom face 11a of the recessed section. In this deflection device, the driving motor 3 is supported on the horizontal upper face 11 with its rotary shaft aligned in the vertical direction.

Moreover, a recessed section is formed in the virtually center of the vertical side face 12, and the fθ lens 5 is supported on the bottom face 12a of the recessed section.

Here, the first reflection mirror 6 is supported on a ridge portion 13 of the horizontal upper face 11 and the vertical side face 12 so that it deflects the light path of the laser beam that has been outputted from the semiconductor laser light source 1 and deflected with a constant angular velocity by the polygon mirror 3 so as to direct the laser beam to the fθ lens 5.

Moreover, the second reflection mirror 7 is placed on a ridge portion of the vertical side face 12 and the horizontal lower face. The laser beam, which has passed through the fθ lens 5 and has been reflected by the second reflection mirror 7, is further reflected by a group of reflection mirrors including a third reflection mirror and thereafter, not shown, installed on the horizontal lower face side, so that the resulting laser beam is directed onto the photosensitive drum supported below the main-body frame 10.

Here, in FIG. 1, the light path of the laser beam that is outputted from the semiconductor laser light source 1 and directed onto the photosensitive drum, not shown, is indicated by an alternate long and short dash line.

As described above, on the ridge portion 13 that is the least susceptible to distortion and strongest in its strength of the main-body frame 10 in the laser scanning device, the first reflection mirror 6 connecting the polygon mirror 3 and the fθ lens 5 is supported. This arrangement makes it possible to accurately direct the laser beam without causing an offset in the laser beam to be directed from the polygon mirror 3 to the fθ lens 5 due to a reduction in the positional precision of the reflection mirror 6 caused by distortion in the main-body frame 10.

With the arrangement in which the semiconductor laser light source 1, the polygon mirror 3 and the driving motor 4 are supported on the bottom face 11a of the recessed section in the horizontal upper face 11 with the fθ lens 5 being supported on the bottom face 12a in the recessed section in the vertical side face 12, it is possible to integrally install the respective members in the main-body frame 10. Thus, it becomes possible to improve the positional precision among the respective optical members, and consequently to form an accurate electrostatic latent image based upon image data on the surface of the photosensitive body.

Here, since the respective optical members are supported on the surface sides of the respective faces of the main-body frame 10 so as to form the light path of the laser beam, it is possible to ensure a light path length required for the laser beam with the size of the laser scanning device limited to a minimum, and consequently to miniaturize the laser scanning device.

Moreover, since the driving motor 4 is supported on the bottom face 11a of the recessed section in the horizontal upper face 11 with its rotary shaft aligned vertically, no lateral load is applied to the rotary shaft. Consequently, it is possible to accurately deflect the laser beam with a constant angular velocity, without making the rotation center of the polygon mirror 3 biased.

Figure 2:
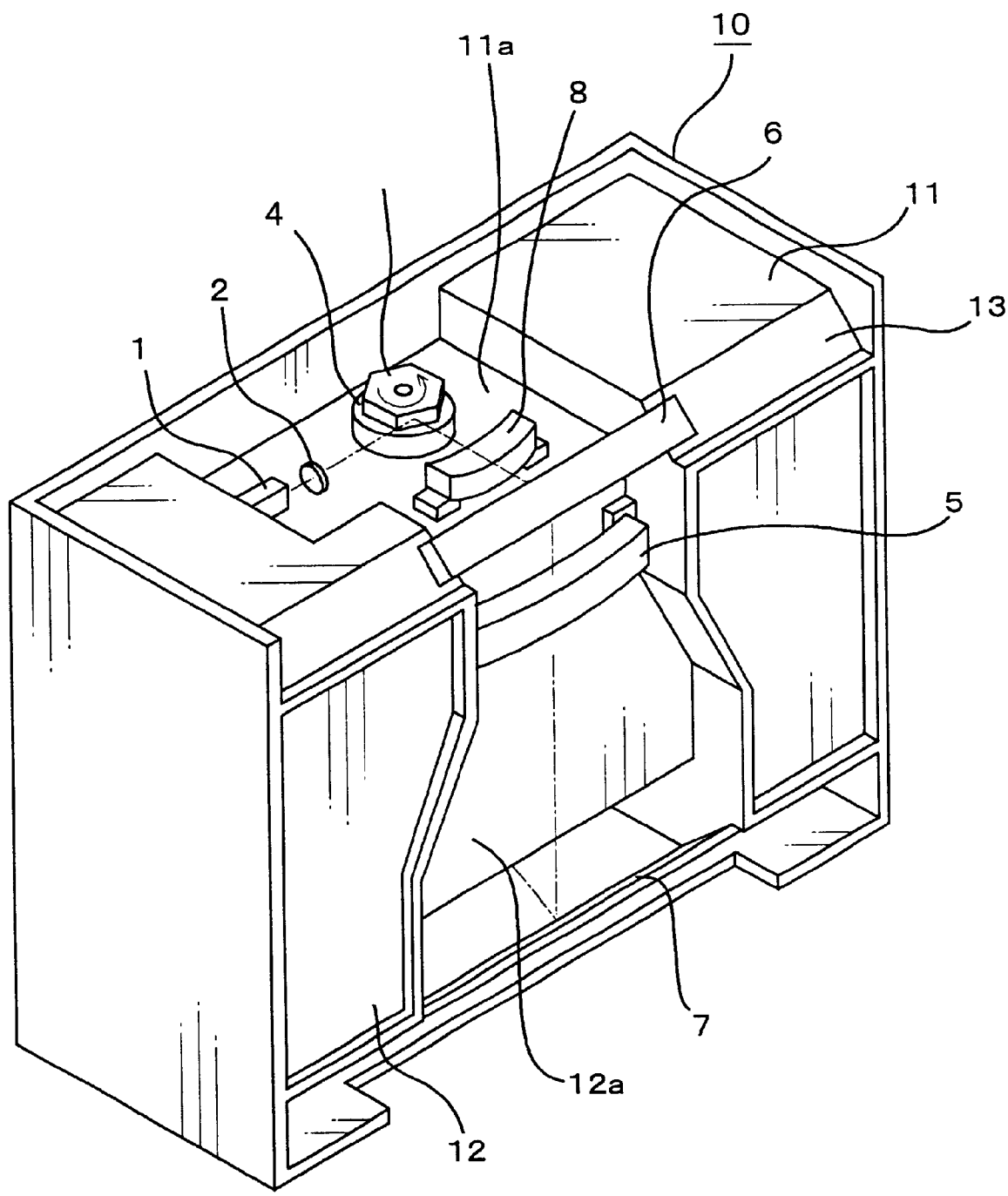
FIG. 2 is a perspective view that schematically shows a structural example that is different from the laser scanning device shown in FIG. 1.

Next, an explanation will be given of another structural example of a laser scanning device in accordance with the present embodiment. FIG. 2 is a perspective view that shows a schematic construction of a laser scanning device that is a structural example different from that shown in FIG. 1.

In this laser scanning device, another second fθ lens 8 is installed in addition to the above-mentioned fθ lens 5. The other optical members are the same as those of the arrangement shown in FIG. 1.

Here, the second fθ lens 8 is supported on the bottom face 11a in an area between the polygon mirror 2 supported on the bottom face 11a of the recessed section in the horizontal upper face 11 of the main-body frame 10 and the reflection mirror 6 supported on the ridge portion 13 of the horizontal upper face 11 and the vertical side face 12.

In other words, in the same manner as the arrangement shown in FIG. 1, the laser scanning device shown in FIG. 2 has an arrangement in which, on the ridge portion 13 that is the least susceptible to distortion and strongest in its strength of the main-body frame 10 in the laser scanning device, the first reflection mirror 6 connecting the polygon mirror 3 and the fθ lens 5 is supported. This arrangement makes it possible to accurately direct the laser beam without causing an offset in the laser beam to be directed from the polygon mirror 3 to the fθ lens 5 due to a reduction in the positional precision of the reflection mirror 6 caused by distortion in the main-body frame 10.

As described above, in accordance with the arrangements shown in FIGS. 1 and 2, since the polygon mirror 3 is supported on the bottom face 11a in the horizontal upper face 11, it is possible to reduce the width (the length in the light path direction connecting the polygon mirror 3 and the reflection mirror 6) in the horizontal direction of the laser scanning device itself. Therefore, it becomes possible to miniaturize a digital color copying machine and a color laser printer of the tandem type in which a plurality of such laser scanning devices are placed in parallel with each other in the horizontal direction.

As described above, the optical scanning device in accordance with the present embodiment, which is an optical scanning device for forming an electrostatic latent image on an image-bearing body with scanning beam released from a light source, is provided with a plurality of optical members for directing the scanning beam from the light source onto the image-bearing body and a support body formed into a polyhedron with a plurality of supporting faces for supporting the optical members, wherein the support body has a first supporting face on which a first optical member is supported and a second supporting face, adjacent to the first supporting face, on which a second optical member is supported, with a reflection mirror for forming a light path for the scanning beam from the first optical member to the second optical member along the two supporting faces being supported on a ridge portion between the first supporting face and the second supporting face.

This arrangement makes it possible to accurately direct the laser beam to the second optical member without causing an offset in the laser beam to be directed from the first optical member to the second optical member due to a reduction in the positional precision of the reflection mirror caused by distortion in the support body, and consequently to miniaturize the optical scanning device.

Moreover, the first optical member may be constituted by a deflection device for deflecting the scanning beam from the light source with a constant angular velocity so as to carry out scanning and/or a first fθ lens for allowing the scanning beam deflected by the deflection device to carry out scanning on the image-bearing body with a constant velocity, and the second optical member may be constituted by a second fθ lens for allowing the scanning beam deflected by the deflection device to carry out scanning on the image-bearing body with a constant velocity.

With the above-mentioned arrangement, an accurate electrostatic latent image can be formed without an offset in the laser light directed to the image-bearing body, thereby making it possible to faithfully record and reproduce image information.

Moreover, the first optical member may be constituted by a deflection device for deflecting the scanning beam from the light source with a constant angular velocity so as to carry out scanning, and the second optical member may be constituted by a second fθ lens for allowing the scanning beam deflected by the deflection device to carry out scanning on the image-bearing body with a constant velocity, wherein a first supporting face of the support body is formed horizontally with a rotary shaft of the deflection device being supported on the first supporting face vertically with respect to the first support face.

With the above-mentioned arrangement, since no lateral load is applied to the rotary shaft, it is possible to accurately deflect the laser light with a constant angular velocity without making the rotation center of the deflection device biased.

[EMBODIMENT 2]

Referring to Figures, the following description will discuss another embodiment of the present invention.

Figure 3:
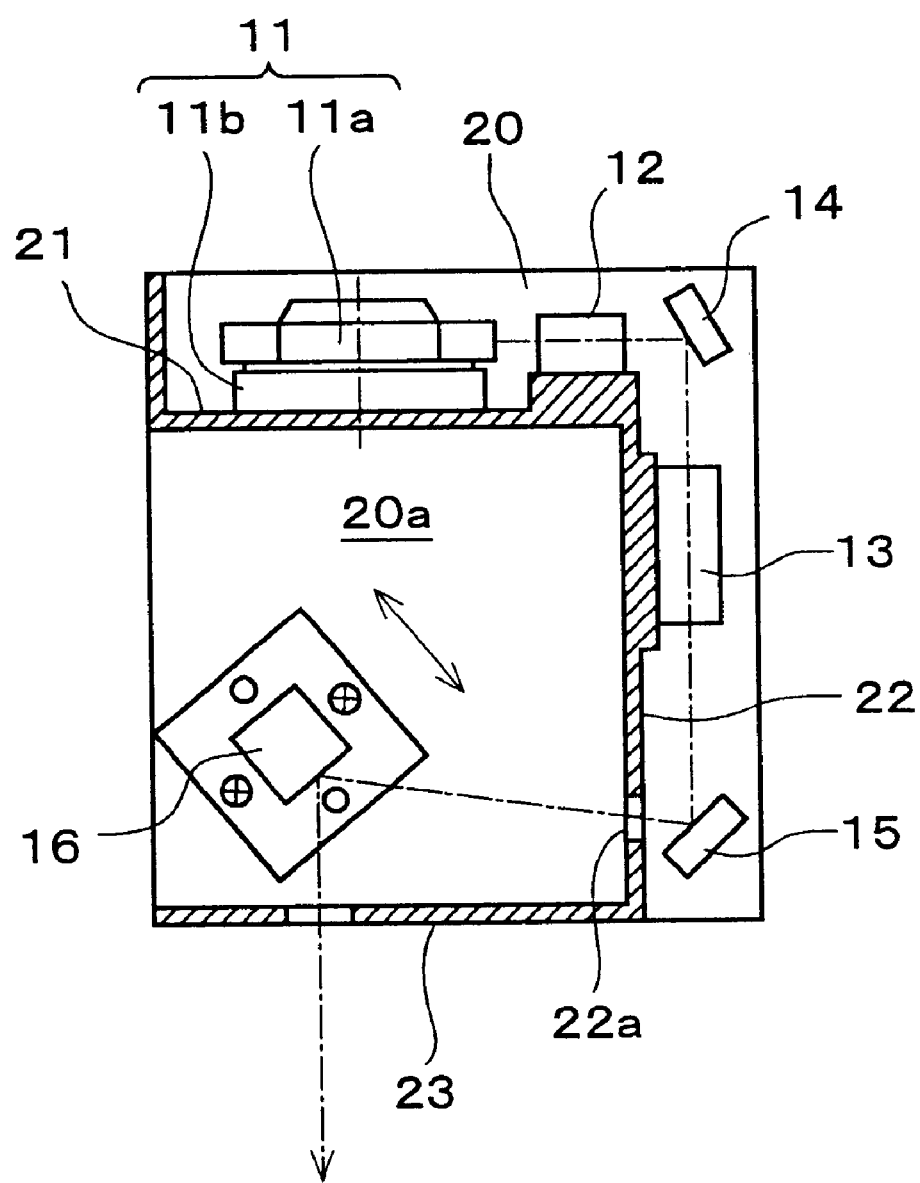
FIG. 3 is a cross-sectional view that schematically shows a structural example of a laser scanning device in accordance with another embodiment of the present invention.
Figure 4:
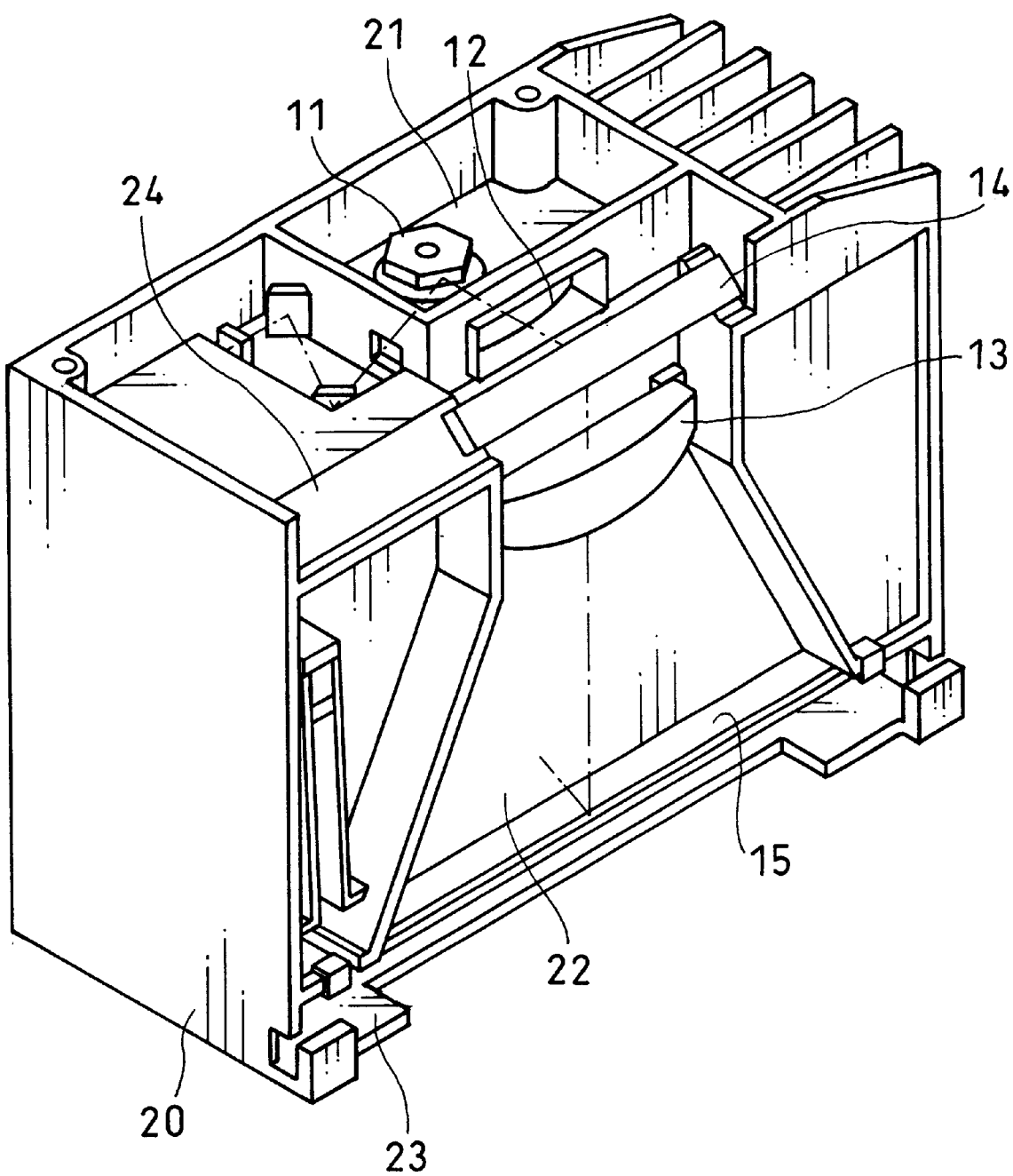
FIG. 4 is a perspective view that schematically shows the laser scanning device shown in FIG. 3.

FIG. 4 is a perspective view that shows a schematic construction of a laser scanning device (optical scanning device) in accordance with the present embodiment. FIG. 3 is a cross-sectional view of the laser scanning device. This laser scanning device is constituted by a semiconductor laser light source (not shown), a collimator lens (not shown), a polygon mirror 11, a driving motor 11b, a first fθ lens 12, a second fθ lens 13, a first reflection mirror 14, a second reflection mirror 15 and a cylinder mirror 16, and these members are supported by a main-body frame 20.

For example, when applied to a digital color copying machine, the semiconductor laser light source outputs a laser beam in accordance with image data that has been read by a scanner unit, not shown, and stored in a memory, and when applied to a laser printer, it outputs a laser beam in accordance with image data that has been transferred from an external terminal device.

The collimator lens is a lens used for converting the modulated laser beam outputted from the semiconductor laser light source into parallel laser light rays.

The polygon mirror 11a deflects the laser beam from the collimator lens in a predetermined direction with a constant angular velocity. The driving motor 11b is used for rotatively driving the polygon mirror 11a. The polygon mirror 11a and the driving motor lib constitute a deflection device 11 that serves as a first optical member.

The first fθ lens 12 corrects the laser beam that has been deflected with a constant angular velocity by the polygon mirror 11a so as to allow the resulting light beam to scan a photosensitive drum with a constant velocity, not shown, and to form a electrostatic latent image without distortion. The second fθ lens 13 further corrects the laser beam that has passed through the first fθ lens 12. Here, the above-mentioned photosensitive drum functions as an image-bearing body constituting an electrophotographing process section.

The first reflection mirror 14 is a mirror for directing the laser beam that has been deflected and reflected by the polygon mirror 11a and has passed through the first fθ lens 12 to the second fθ lens 13. The second reflection mirror 15 is one of a group of mirrors that reflect and direct the laser beam from the second fθ lens 13 onto the photosensitive drum. The cylinder mirror 16 is a mirror for directing the laser beam reflected by the second reflection mirror 15 onto the photosensitive drum.

The main-body frame 20, which has a virtually rectangular parallelopiped (polyhedron) shape, is provided with a horizontal upper face (first supporting face) 21, a vertical side face (second supporting face) 22 that is adjacent to the horizontal upper face 21 and a horizontal lower face 23.

The deflection device 11, constituted by the semiconductor laser light source, the polygon mirror 11a and the driving motor 11b, is supported on the horizontal upper face 21. The driving motor 11b in the deflection device 11 is supported on the horizontal upper face 21 with its rotary shaft aligned in the vertical direction. Further, the first θ lens 12 is supported on the horizontal upper face 21. Moreover, the second fθ lens 13 is supported on the vertical side face 22.

Here, the first reflection mirror 14 is supported on a ridge portion 24 of the horizontal upper face 21 and the vertical side face 22 in such a manner that the light path of the laser beam that has been outputted from the semiconductor laser light source and deflected with a constant angular velocity by the polygon mirror 11a and has passed through the first fθ lens 12 is bent and directed to the second fθ lens 13.

The second reflection 15 is placed on a ridge portion of the vertical side face 22 and the horizontal lower face 23. The laser beam, which has passed through the second fθ lens 13 and has been reflected by the second reflection mirror 15, is allowed to pass through an aperture section 22a in the vertical side face 22, and made incident on an inner space 20a surrounded and formed by the horizontal upper face 21, the vertical side face 22 and the horizontal lower face 23.

The cylinder mirror 16 is installed in the inner space 20a in a manner so as to be adjustable in its position. Thus, the laser beam, which has been reflected by the second reflection mirror 15 and made incident on the inner space 20a, is further reflected by the cylinder mirror 16 and directed to the photosensitive drum supported below the main-body frame 20.

Here, in FIGS. 3 and 4, the light path of the laser beam that is outputted from the semiconductor laser light source and directed onto the photosensitive drum, is indicated by an alternate long and short dash line.

As described above, on the ridge portion 24 that is the least susceptible to distortion and strongest in its strength of the main-body frame 20 in the laser scanning device, the first reflection mirror 14 that connects the deflection device 11 and the first fθ lens 12 to the second θ lens 13 is supported. Here, these members are integrally installed in the main-body frame 20. Thus, this arrangement makes it possible to accurately direct the laser beam without causing any positional offset in the laser beam due to a reduction in the positional precision of the first reflection mirror 14 and a reduction in the positional precision among the respective members caused by distortion in the main-body frame 20.

With the arrangement in which the semiconductor laser light source, the deflection device 11 and the first fθ lens 12 are supported on the horizontal upper face 21 and the second fθ lens 13 is supported on the vertical side face 22, it is possible to integrally install the respective members in the main-body frame 20. Thus, it becomes possible to improve the positional precision among the respective optical members, and consequently to form an accurate electrostatic latent image based upon image data on the surface of the photosensitive body.

Here, the respective optical members are supported on the surface sides of the respective faces of the main-body frame 20 so as to form the light path of the laser beam, and the cylinder mirror 16 is placed in the inner space 20a of the main body frame 20. Therefore, since the space in the main-body frame 20 is effectively utilized, it is possible to ensure a light path length required for the laser beam with the size of the laser scanning device limited to a minimum, and consequently to miniaturize the laser scanning device.

Moreover, since the driving motor 11b in the deflection device 11 is supported on the horizontal upper face 21 with its rotary shaft aligned vertically, no lateral load is applied to the rotary shaft. Consequently, it is possible to accurately deflect the laser beam with a constant angular velocity, without making the rotation center of the polygon mirror 11a biased.

Figure 5:
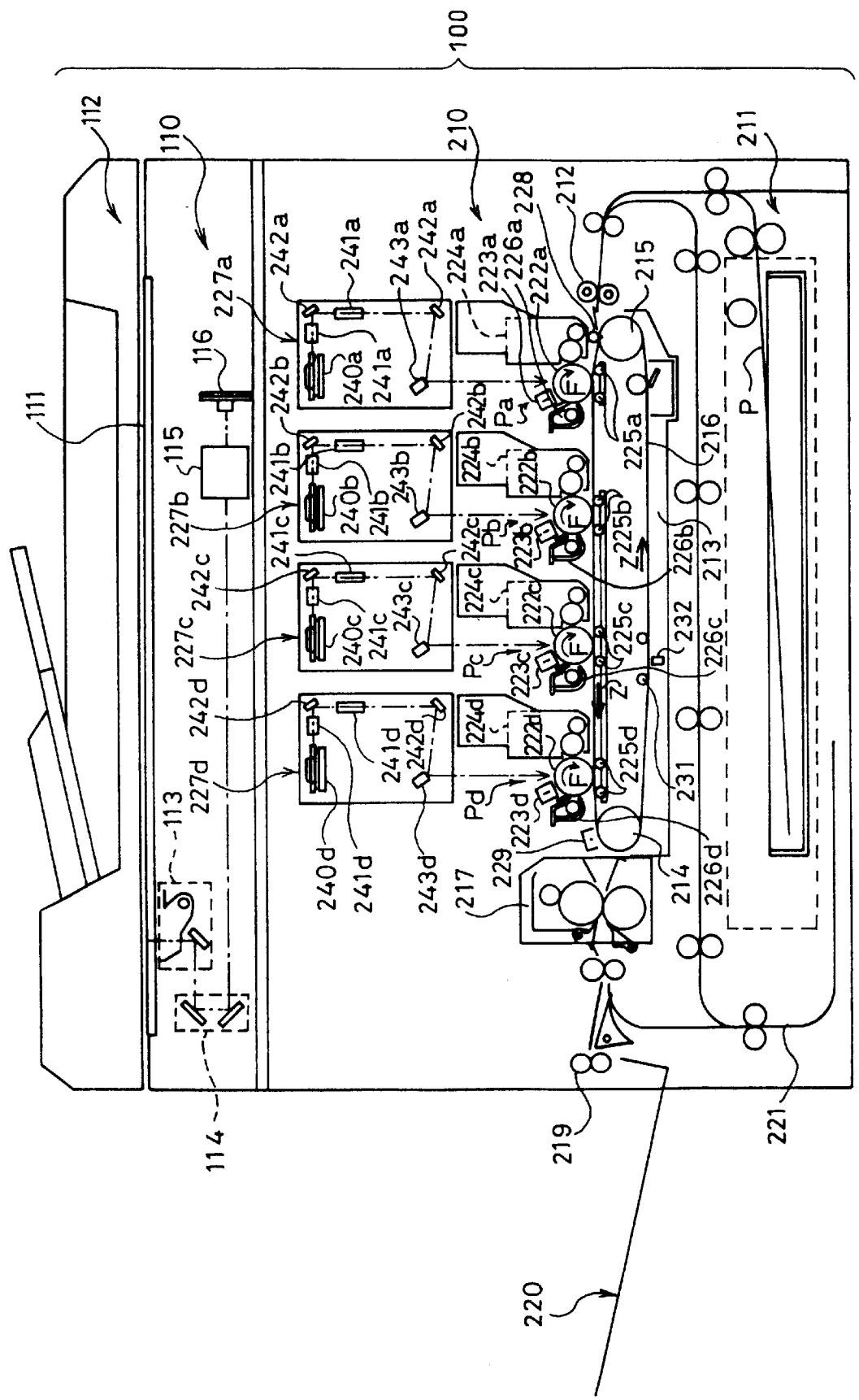
FIG. 5 is a cross-sectional view that schematically shows the construction of a digital color copying machine of a tandem system to which the laser scanning device is applied.

FIG. 5 is a digital color copying machine (hereinafter, referred to simply as a copying machine) 100 of the tandem type to which the above-mentioned laser scanning device is applied. On the upper surface of the copying machine 100 are installed a document platen 111 and an operation panel, not shown, and inside the copying machine 100 are installed an image-reading section 110 and an image-forming section 210.

A recirculating automatic document feeder (hereinafter, referred to as RADF) 112 is installed on the upper face of the document platen 111 in a manner so as to be freely openable with respect to the document platen 111. This RADF 112 is placed in a predetermined positional relationship with the surface of the document platen 111.

The RADF 112 transports original documents so as to allow one of the surfaces of each document to face the image-reading section 110 at a predetermined position of the document platen 111. After completion of the image reading process on the one surface of the document, the original document is reversed and transported to the document platen 111 so as to allow the other surface to face the image-reading section 110 at the predetermined position of the document platen 111.

After the image-reading processes have been completed on both of the surfaces of one original document, the original document is discharged, and the double-sided transporting operation is carried out on the next original document. The above-mentioned transporting and reversing operations of original documents are controlled in association with operations related to the copying machines as a whole.

The image-reading section 110 is placed below the document platen 111 so as to read the image of an original document that has been transported onto the document platen 111 by the RADF 112. The image-reading section 110 is provided with a document scanning body that reciprocally shifts in parallel with the lower face of the document platen 111, an optical lens 115 and a CCD line sensor 116.

This document scanning body is constituted by a first scanning unit 113 and a second scanning unit 114.

The first scanning unit 113 has an exposure lamp for exposing the surface of a document image and a first mirror for deflecting a reflected light image from the document in a predetermined direction. Here, the first scanning unit 113 is designed to reciprocally shift at a predetermined scanning speed with a given distance maintained from the lower face of the document platen 111.

The second scanning unit 114 is provided with second and third mirrors which further deflect the reflected light image from the original document that has been deflected by the first mirror of the first scanning unit 113. Here, the second scanning unit 114 is designed to reciprocally shift in parallel with the first scanning unit 113 in a predetermined velocity relationship therewith.

The optical lens 115 converges the reflected light image from the original document that has been deflected by the third mirror of the second scanning unit 114, thereby forming the converged light image at a predetermined position on the CCD line sensor 116.

The CCD line sensor 116 successively transfers the converged light image photoelectrically, and outputs the resulting electric signal. The CCD line sensor 116 is constituted by color CCDs of the 3-line system capable of reading a monochrome image or a color image, separating it into respective color components and outputting line data representative of the respective color components of R(red), G(green) and B(blue). This document image information, converted into an electric signal by the CCD line sensor 116, is further transferred to an image-processing section, not shown, where it is subjected to a predetermined image-data processing.

Next, an explanation will be given of the construction of the image-forming section 210 and the constructions of respective members related to the image-forming section 210.

Below the image-forming section 210 is installed a paper-feed mechanism 211 which separates sheets of paper (copying material) P stacked and housed in a paper tray, and supplies them sheet by sheet to the image-forming section 210. The paper P, thus separated and supplied sheet by sheet, is transported to the image-forming section 210 in synchronism with a pair of registration rollers 212 placed immediately before a paper inlet to the image-forming section 210.

Moreover, the paper P, which has an image on its one surface, is transported so as to be again supplied to the image-forming section 210 in synchronism with the image-forming process in the image-forming section 210.

Below the image-forming section 210 is placed a transferring conveyor belt mechanism 213. This transferring conveyor belt mechanism 213 is provided with a driving roller 214, a driven roller 215, a tension roller 231 and a transferring conveyor belt (transferring belt) 216 that is stretched and allowed to pass over these rollers. This transferring conveyor belt mechanism 213 is arranged to electrostatically attract paper P thereto so as to transport it.

Moreover, on the downstream side of the transferring conveyor belt mechanism 213 in the paper transport path is placed a fixing device 217 for fixing onto the paper P a toner image transferred and formed on the paper P. The paper P that has passed through the nip between the pair of fixing rollers in the fixing device 217 is allowed to pass through a transferring-direction switching gate 218, and discharged onto a paper-discharge tray 220 attached to an outer wall of the copying machine main body 1 by a discharge roller 219.

The transferring-direction switching gate 218 selectively makes a switchover between the paths for discharging the paper P outside the copying machine main body 1 and for re-supplying the paper P toward the image-forming section 210 with respect to the transporting paths of the paper P after the fixing process.

The paper P, which has been switched in its transporting direction so as to again proceed to the image-forming section 210 by the transferring-direction switching gate 218, is reversed in its sides through a switch-back transport path 221, and then again supplied to the image-forming section 210.

Moreover, above the transferring conveyor belt 216 in the image-forming section 210 are placed a first image-forming station Pa, a second image-forming station Pb, a third image-forming station Pc and a fourth image-forming station Pd in the vicinity of the transferring conveyor belt 216, in this order from the upstream side of the paper transport path.

The transferring conveyor belt 216 is frictionally driven by the driving roller 214 in the direction indicated by arrow Z in FIG. 1 so that the paper P, supplied through the paper-feed mechanism 211 as described earlier, is held thereon by means of electrostatic attraction, and successively transported through the image-forming stations Pa, Pb, Pc and Pd.

The respective image-forming stations Pa, Pb, Pc and Pd have a virtually identical construction. The respective image-forming stations Pa, Pb, Pc and Pd are provided with photosensitive drums 222a, 222b, 222c and 222d that are driven so as to rotate in the direction of arrow F in FIG. 5.

On the periphery of the respective photosensitive drums 222a, 222b, 222c and 222d are placed chargers 223a, 223b, 223c and 223d, developing devices 224a, 224b, 224c and 224d, transfer rollers 225a, 225b, 225c and 225d, and cleaning devices 226a, 226b, 226c and 226d successively along the rotation direction of the photosensitive drums 222a, 222b, 222c and 222d.

The chargers 223a, 223b, 223c and 223d are used for uniformly charging the photosensitive drums 222a, 222b, 222c and 222d respectively. The developing devices 224a, 224b, 224c and 224d develop electrostatic latent images formed on the photosensitive drums 222a, 222b, 222c and 222d respectively. The transfer rollers 225a, 225b, 225c and 225d serving as transfer means transfer developed toner images on the photosensitive drums 222a, 222b, 222c and 222d onto paper P. The cleaning devices 226a, 226b, 226c and 226d remove residual toner from the photosensitive drums 222a, 222b, 222c and 222d.

Moreover, above the respective photosensitive drums 222a, 222b, 222c and 222d are placed laser beam scanner units (hereinafter, referred to as LSU) 227a, 227b, 227c and 227d. These LSUs 227a, 227b, 227c and 227d are respectively provided with: semiconductor laser elements (not shown) polygon mirrors (deflection devices) 240a, 240b, 240c and 240d; fθ lenses 241a, 241b, 241c and 241d; and mirrors 242a, 242b, 242c, 242d, 243a, 243b, 243c and 243d.

The semiconductor laser elements emit dot beams that have been modulated in accordance with image data. The polygon mirrors 240a, 240b, 240c and 240d are used for deflecting the laser beams from the semiconductor laser elements in the main scanning direction. The fθ lenses 241a, 241b, 241c and 241d and mirrors 242a, 242b, 242c, 242d, 243a, 243b, 243c and 243d are used for converging the laser beams that have been deflected by the polygon mirrors 240a, 240b, 240c and 240d onto the surfaces of the photosensitive drums 222a, 222b, 222c and 222d so as to form images thereon.

A pixel signal corresponding to a black component image of a color document image is inputted to the LSU 227a; a pixel signal corresponding to a cyan component image of the color document image, to the LSU 227b; a pixel signal corresponding to magenta component image of the color document image, to the LSU 227c; and a pixel signal corresponding to yellow component image of the color document image, to the LSU 227d, respectively.

With this arrangement, electrostatic latent images corresponding to pieces of document image information that have been color-converted are formed on the respective photosensitive drums 222a, 222b, 222c and 222d. Here, the developing devices 227a, 227b, 227c and 227d respectively house black toner, cyan toner, magenta toner and yellow toner so that the electrostatic latent images on the photosensitive drums 222a, 222b, 222c and 222d are developed by these toners of the respective colors. Thus, pieces of document image information, color-converted by the image-forming section 210, are reproduced as toner images of the respective colors.

Moreover, a paper-attracting charge roller 228 is installed between the first image-forming station Pa and the paper-feed mechanism 211. This paper-attracting charge roller 228 is used for charging the surface of the transferring conveyor belt 216. Thus, paper P supplied from the paper-feed mechanism 211, which is positively held on the transferring conveyor belt 216 by means of electrostatic attraction, is transported from the first image-forming station Pa to the fourth image-forming station Pd without causing any offset.

Moreover, a charge-eliminating device 229 is installed virtually right above the driving roller 214 between the fourth image-forming station Pd and the fixing device 217. An ac current is applied to this charge-eliminating device 229 so as to separate the paper P that has been electrostatically attracted onto the transferring conveyor belt 216 from the transferring conveyor belt 216.

In a digital color copying machine having the above-mentioned arrangement, cut-sheet type paper is used as the paper P. When this paper P is sent from a paper-feed cassette, and supplied into a guide in the paper transport path of the paper-feed mechanism 211, the leading portion of the paper P is detected by a sensor (not shown). Then, based upon a detection signal outputted from this sensor, the transportation of the paper P is temporarily stopped by the pair of resist rollers 212.

Then, the paper P is sent onto the transferring conveyor belt 216 rotating in the direction of arrow Z in FIG. 1 in synchronism with the respective image-forming stations Pa, Pb, Pc and Pd. In this case, since the transferring conveyor belt 216 is subjected to the predetermined charge by the paper-attracting charge roller 228 as described above, the paper P is transported and supplied in a stable state while passing through the respective image-forming stations Pa, Pb, Pc and Pd.

In the respective image-forming stations Pa, Pb, Pc and Pd, respective toner images are formed, and the toner images of the respective colors are superposed on the supported face of the paper P that is transported in an electrostatically attracted state onto the transferring conveyor belt 216. Upon completion of the transferring process of the image by the fourth image-forming station Pd, the paper P is separated from the transferring conveyor belt 216 successively from its leading portion by the charge-eliminating device 229, and directed to the fixing device 217.

Lastly, the paper P on which the toner image has been fixed is discharged onto the paper-discharge tray 220 from a paper outlet (not shown).

In the digital color copying machine of the tandem type having the above-mentioned arrangement, the toner images, which have been reproduced and recorded by the image-forming stations Pa, Pb, Pc and Pd of the respective colors, need to be accurately adjusted in their superposing (registration) position at the time of transferring onto the paper P. This is because any offset in the superposing position of the toner images of the respective colors causes an offset in image dots formed by the toners of the respective colors, with the result that a color offset occurs, thereby causing degradation in the image quality of the color image.

Therefore, in order to accurately superpose the toner images (images) formed in the respective image-forming stations Pa, Pb, Pc and Pd, the following various compensations are carried out so as to make the leading edge and rear edge of each of the toner images (images) in the image sub-scanning direction and the leading edge and rear edge of each of the toner images (image) in the image main-scanning direction coincident in their positions. Thus, the occurrence of a color offset is reduced to a minimum.

In the respective image-forming stations Pa, Pb, Pc and Pd, the coincidence with respect to the leading edge and rear edge in the sub-scanning direction of the images to be recorded is achieved in the following manner. That is, control is provided so that writing operations of images by the main scanning are started in synchronism with the paper passing through the image-forming stations Pa, Pb, Pc and Pd of the respective colors so as to make the leading edges of the images in the sub-scanning direction coincident with each other.

Here, in the image-forming stations Pa, Pb, Pc and Pd of the respective colors that operate in the same processing speed, the scanning and writing of the images are carried out by the deflection device 11 that rotates in the same predetermined number of revolutions; therefore, the rear edges of all the images in the sub-scanning direction have the same transferring position.

Figure 6:
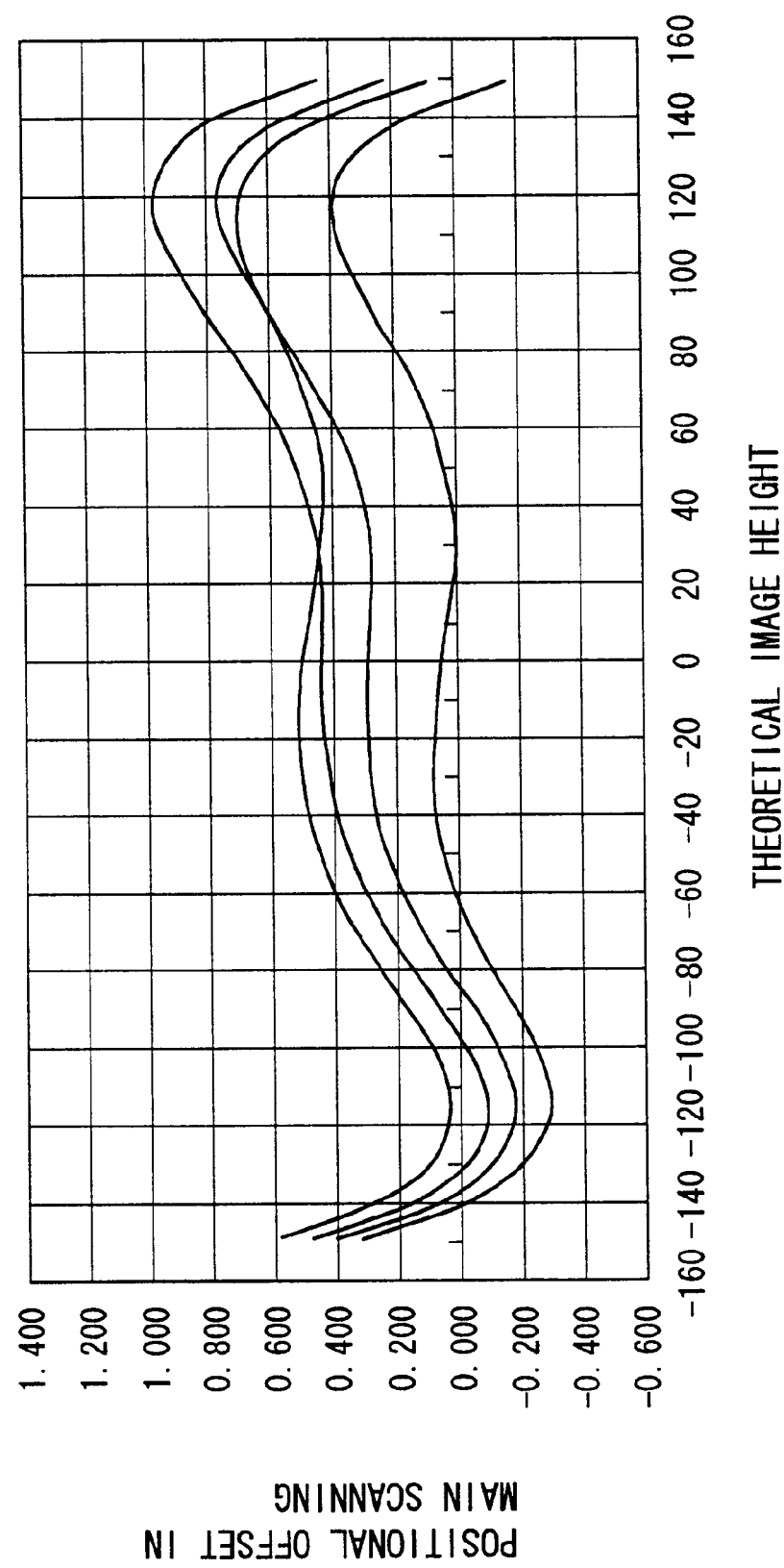
FIG. 6 is a graph that shows optical characteristics of the laser scanning device in each image-forming station installed in the digital color copying machine.

FIG. 6 is a graph showing characteristics that summarize the results of measurements carried out on the main scanning positional offsets at respective image heights in order to show the optical characteristics of the LSUs 227a, 227b, 227c and 227d in the image-forming stations Pa, Pb, Pc and Pd of the respective colors. Here, in this graph showing characteristics, the axis of ordinates represents the amount of a positional offset from the optimal position in the main scanning direction, and the axis of abscissas represents the distance of an offset that is obtained, supposing that, based upon the center of the light axis, the offset toward the front side is minus (−) and the offset toward the rear side is plus (+) on the photosensitive drum surface. Moreover, this graph shows the optical characteristics of the LSU 227a, 227b, 227c and 227d of the image-forming stations Pa, Pb, Pc and Pd respectively.

The graph showing the optical characteristics shown in FIG. 6 is obtained from the LSU 227a, 227b, 227c and 227d that have been formed by basically assembling the same optical parts in the same manner; therefore, virtually equal optical characteristics are obtained. However, there is a slight offset in the main-scan recording characteristics of an image due to variations in the various optical parts and variations at the time of assembling the units, etc. As shown in FIG. 6, in the respective characteristic curves, although the shapes of the respective characteristic curves are virtually the same, there are slight variations in the to and fro directions.

From this state where there are some variations in the LSUs, an adjustment is made by controlling the recording start point of the image in the main-scanning direction (the leading edge of the image in the main-scanning direction).

The adjusting method which is carried out by controlling the recording start point of the image in the main-scanning direction includes the following method. That is, based upon a beam detection signal from a beam detection sensor installed in each LSU, the timing in which the writing process of the image is started is shifted in the to and fro directions in each of the image-forming stations of the respective colors so as to carry out an adjustment. More specifically, based upon the beam detection signal, a counting process is carried out by using a timer or a counter so that upon reaching a predetermined value, a modulated recording process based upon image data is started.

Figure 7:
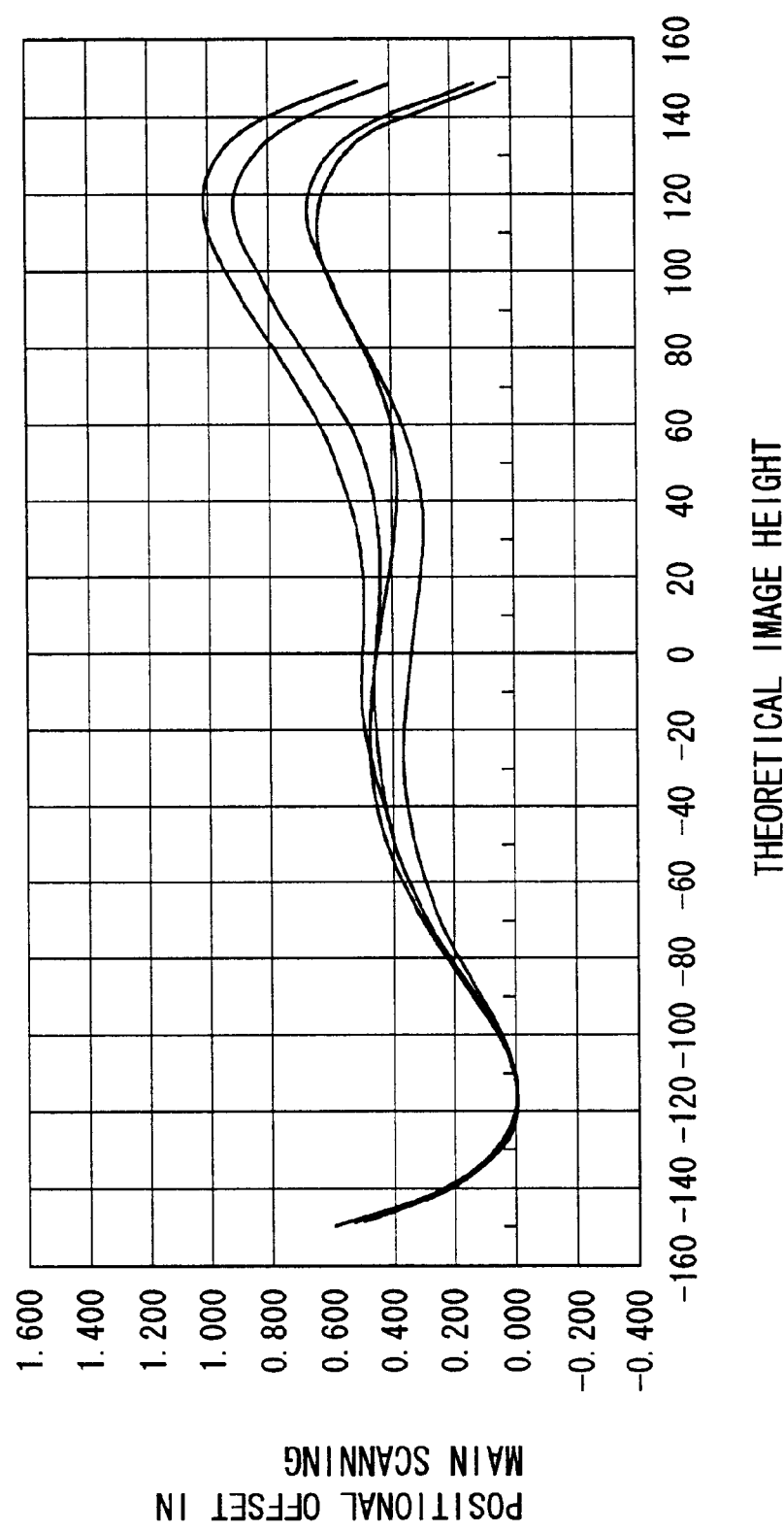
FIG. 7 is a graph that shows optical characteristics of the laser scanning device in each image-forming station installed in the digital color copying machine, in a state where recording start points of images are made coincident.

FIG. 7 is a graph showing characteristics in which, by using the above-mentioned control, the recording start points (the leading edges of the images in the main-scanning direction) of the images are made coincident with each other in the image-forming stations Pa, Pb, Pc and Pd of the respective colors by the above-mentioned controlling process. Here, in the graph showing characteristics in FIG. 7, the results of an adjustment are shown, in which the writing positions of the respective colors are made coincident at a position of minus 115 mm.

Next, an explanation will be given of an adjustment on the recording end points of the images in the main-scanning direction, that is, the rear edges of the images in the main-scanning direction. The offsets in the recording end points of the images in the main-scanning direction occur due to variations in the optical magnification in the main-scanning direction, etc.

The method of adjustments to be carried out here is described as follows: In order to control the magnification (extension and shrinkage) of the image in the main-scanning direction, an adjustment is made on the image writing clock for carrying out recording of the image in the main-scanning direction on a dot basis. This adjustment is carried out so as to make the lengths (widths) of the images from the leading edge to the rear edge of each image coincident with each other in all the image-forming stations Pa, Pb, Pc and Pd of the respective colors.

With respect to the adjustment method for the image writing clock, a method is proposed in which a VCO (Voltage Control Oscillator) is used as an image writing clock oscillator circuit so that the adjustment is made by varying the voltage to be supplied to the VCO.

Figure 8:
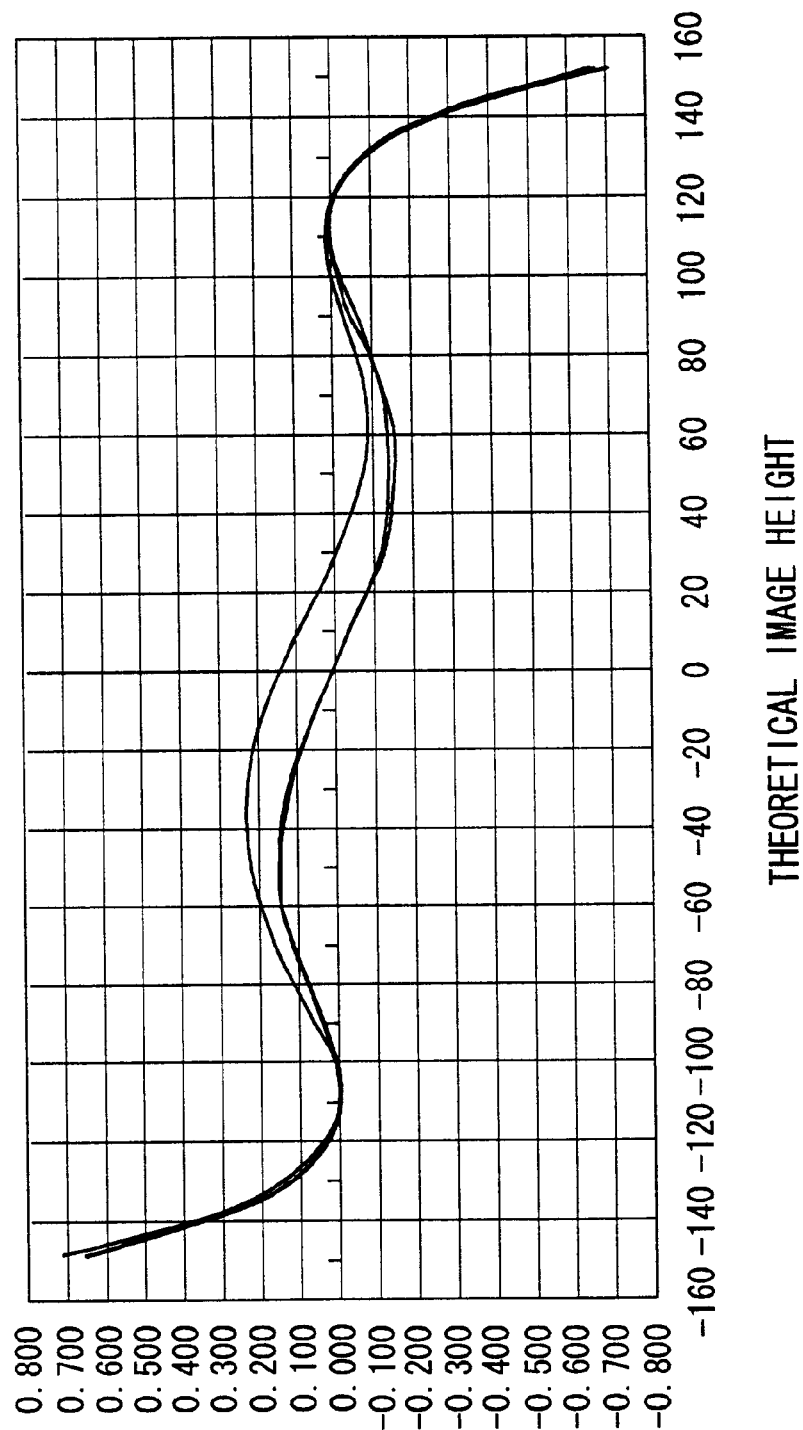
FIG. 8 is a graph that shows optical characteristics of the laser scanning device in each image-forming station installed in the digital color copying machine, in a state where recording start points and completion points of images are made coincident.

FIG. 8 is a graph showing characteristics in which, by using the above-mentioned control, the recording start points and end points of the images, that is, the leading edges and the rear edges of the images in the main-scanning direction, are made coincident with each other in the image-forming stations Pa, Pb, Pc and Pd of the respective colors by the above-mentioned controlling process. Here, in the graph showing characteristics in FIG. 8, the results of an adjustment are shown, in which the writing positions of the respective colors are adjusted so as to be made coincident at positions of minus 115 mm and plus 115 mm.

By using the above-mentioned adjustments, the recording start points (leading edges of the images) and recording end points of the images in the main-scanning direction recorded by the image-forming stations Pa, Pb, Pc and Pd of the respective colors are respectively made coincident with each other.

However, in the case when, during the main-scan recording process, variations, etc. in the optical members such as, for example, reflection mirrors and fθ lenses, have not been completely corrected, images recorded between the start point and end point of the images in the main scanning direction are not properly superposed. For example, the graph showing characteristics of FIG. 6 represents a state in which there is a variation in one of the four LSUs.

Figure 9:
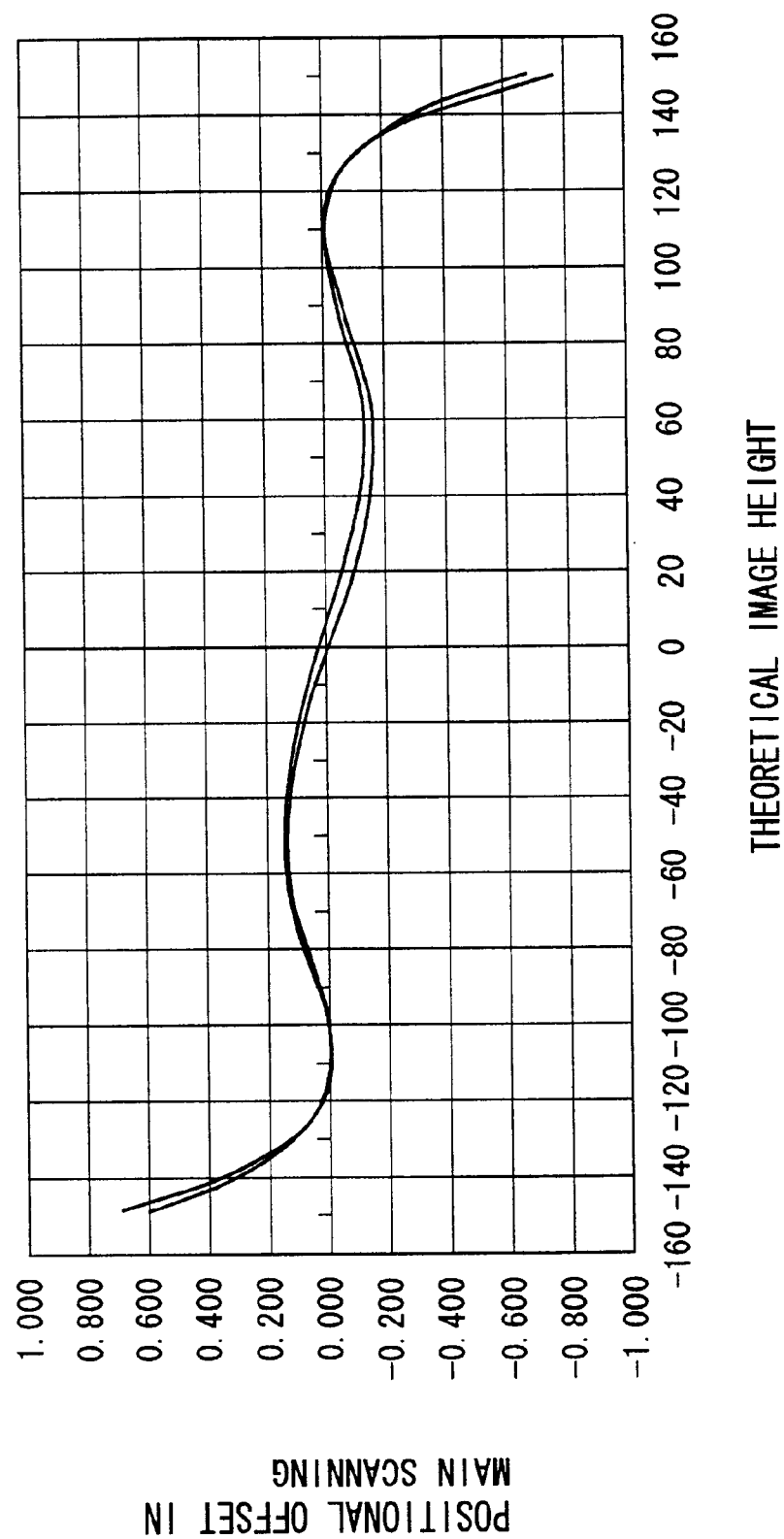
FIG. 9 is a graph that shows optical characteristics of the laser scanning device in each image-forming station installed in the digital color copying machine, in a state where positional adjustments have been made on a cylinder mirror.

Therefore, with respect to the LSU having the variation, a positional adjustment is carried out on the cylinder mirror 16 shown in FIG. 3 so that the main-scan recording points in all the image-forming stations Pa, Pb, Pc and Pd are made coincident with each other, as indicated by a graph showing the characteristics in FIG. 9. This arrangement makes it possible to reduce color offsets in the images recorded between the start point and end point of the images in the main scanning direction.

With respect to the positional adjustment mechanism for the cylinder mirror 16, although not shown in the Figures, an arrangement is proposed in which, while one end of the cylinder mirror 16 extending in the main-scanning direction is allowed to serve as a supporting fulcrum, the other end is shifted in the direction of an arrow in FIG. 3. Here, the direction of the arrow in FIG. 3 is set to be the same as the direction of an isometrical bisector of an angle formed by the laser incident beam and the return beam in the cylinder mirror 16.

Here, in order to widen the adjustable range of the position of the cylinder mirror 16, another arrangement may be proposed in which the positions of both ends of the cylinder mirror 16 extending in the main-scanning direction are made adjustable.

Moreover, in the present explanation, a fine adjustment is carried out by shifting the cylinder mirror 16 in the direction of the arrow in FIG. 3; however, taking into consideration the generation of a bent (bow) of the scanning line caused by the adjustment of the cylinder mirror 16, another adjusting mechanism for allowing a fine adjustment also in a direction virtually perpendicular to the direction of the arrow in FIG. 3 may be added.

Figure 10:
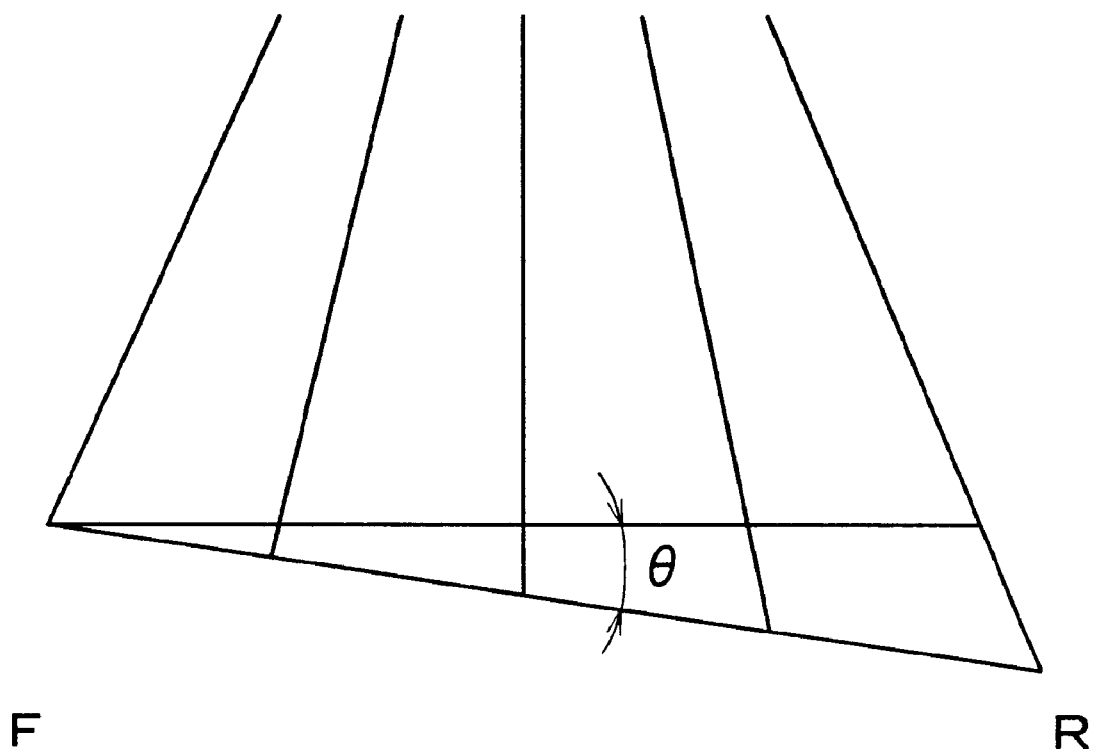
FIG. 10 is an explanatory drawing that schematically shows the principle of the adjustments of the cylinder mirror.

FIG. 10 is an explanatory drawing that schematically shows the principle as to how the cylinder mirror 16 is adjusted. Here, the position (θ) of the cylinder mirror 16 is finely adjusted so that the image heights on the surface of the photosensitive drum at the time of a main-scan recording process become virtually the same in the main-scanning direction (from the front side F to the rear side R).

With the above-mentioned adjustment, it is possible to reduce offsets in the image recording points of the LSUs in the main-scanning direction in the image-forming stations Pa, Pb, Pc and Pd, and consequently to superpose images of the respective colors that are recorded and reproduced at the respective image-forming stations Pa, Pb, Pc and Pd with a superior positional precision. Therefore, it becomes possible to provide good color images in which original colors are faithfully reproduced without the generation of color offsets, etc.

Figure 11:
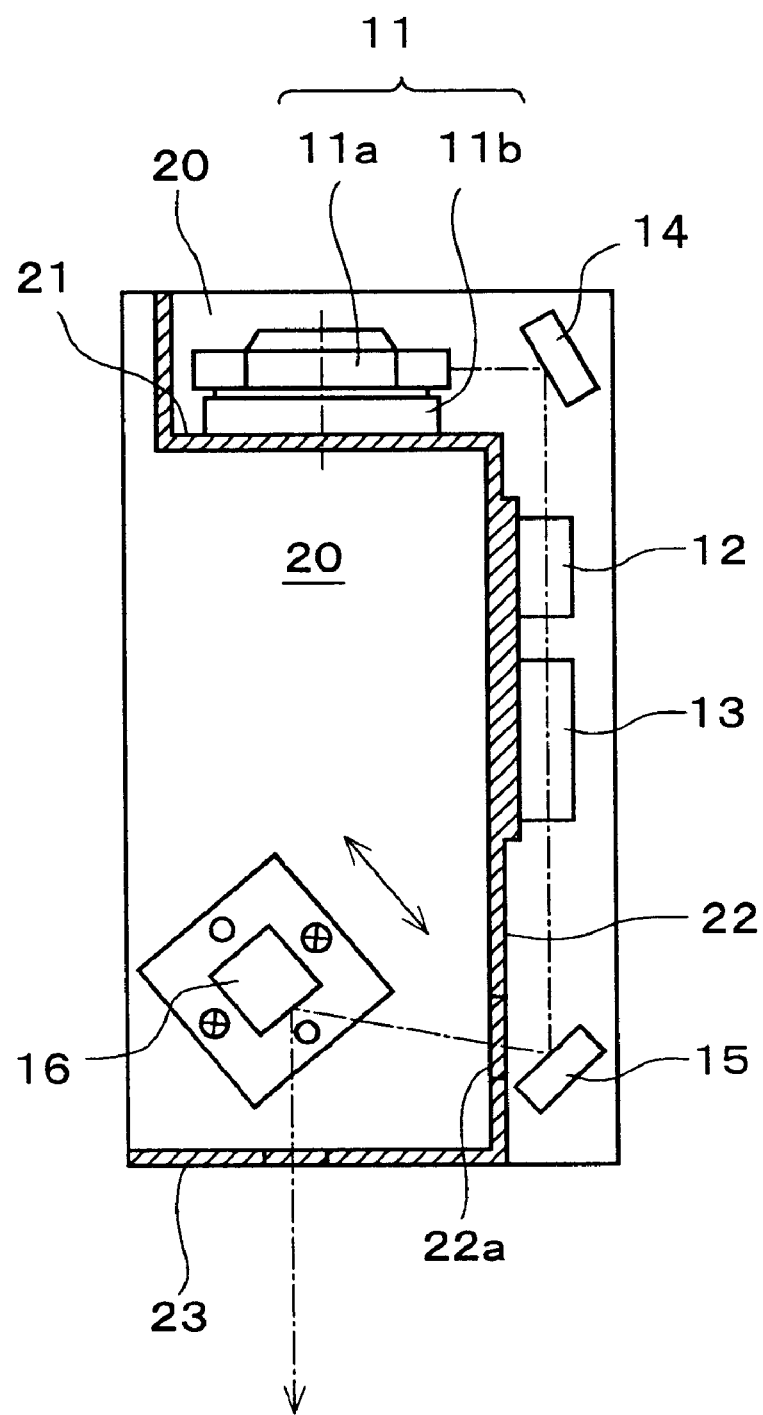
FIG. 11 is a perspective view that schematically shows a structural example that is different from the laser scanning device shown in FIG. 3.

Next, an explanation will be given of another structural example of a laser scanning device in accordance with the present embodiment. FIG. 11 is a cross-sectional view that schematically shows the structure of a laser scanning device as the structural example different from that shown in FIG. 3.

In the laser scanning device shown in FIG. 11, only the semiconductor laser light source and the deflection device 11 are supported on the horizontal upper face 21. Further, the first fθ lens 12 and the second fθ lens 13 are supported on the vertical side face 22. In contrast, in the structure shown in FIG. 3, the semiconductor laser light source, the deflection device 11 and the first fθ lens 12 are installed on the horizontal upper face 21. In other words, it is easier for the structure shown in FIG. 11 to miniaturize the area of the horizontal upper face 21.

Therefore, the laser scanning device shown in FIG. 11 makes it possible to further reduce its size in the horizontal direction as compared with the laser scanning device shown in FIG. 3. Therefore, the application of this laser scanning device to an image-forming apparatus of the tandem type makes it possible to further miniaturize the image-forming apparatus.

As described above, the optical scanning device in accordance with the present embodiment, which is an optical scanning device for forming an electrostatic latent image on an image-bearing body with scanning beam from a light source, is provided with a plurality of optical members for directing the scanning beam from the light source onto the image-bearing body and a support body formed into a polyhedron with a plurality of supporting faces for supporting the optical members, wherein the support body has a first supporting face on the surface side of which a deflection device for changing the course of the scanning beam to the main-scanning direction is supported and a second supporting face, adjacent to the first supporting face, on which an optical member is supported, with a cylinder mirror for directing the scanning beam onto the image-bearing body being placed in an inner space formed by the first supporting face and the second supporting face.

With this arrangement, a light path for the scanning beam from the deflection device to the optical member is formed along the first and second supporting faces, and the cylinder mirror for directing the scanning beam onto the image-bearing body is placed in the inner space formed by the first and second supporting faces; thus, it is possible to miniaturize the optical scanning device. Moreover, for example, when the optical scanning device having the above-mentioned structure is applied to an image-forming apparatus of the tandem type having a plurality of image-bearing bodies and optical scanning devices arranged in parallel with each other, it becomes possible to miniaturize the size of the apparatus even when it is provided with a plurality of image-bearing bodies.

Here, the above-mentioned cylinder mirror may be placed in a manner so as to be adjustable in its position.

With this arrangement, by adjusting the position of the cylinder mirror, it is possible to positively eliminate errors in installation positions among the respective members with a simple structure, and consequently to direct the scanning beam onto each image-bearing body in an appropriate manner.

Additionally, the above-mentioned embodiments have exemplified a case in which a laser light beam is used as a scanning beam released from a light source; however, the present invention is not intended to be limited thereby, and any light may be used as the scanning beam as long as the light can form a light image on the image-bearing body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical scanning device for forming an electrostatic latent image on an image-bearing body with scanning beam released from a light source, comprising:

a support body having a plurality of supporting faces;

first and second optical means for directing the scanning beam from the light source onto the image-bearing body, the first optical means being installed on a first supporting face of the support body, the second optical means being installed on a second supporting face adjacent to the first supporting face; and light transmitting means for transmitting the scanning beam from the first optical means to the second optical means, installed in the vicinity of a ridge portion between the first supporting face and the second supporting face.

2. The optical scanning device as defined in claim 1, wherein said light transmitting means is a reflection mirror.

3. The optical scanning device as defined in claim 1, wherein said first optical means has a deflection device for allowing the scanning beam from the light source to deflect and scan with a constant angular velocity.

4. The optical scanning device as defined in claim 3, wherein the deflection means has a polygon mirror and a driving motor for rotatively driving the polygon mirror.

5. The optical scanning device as defined in claim 3, wherein said first optical means is further provided with a θ lens for allowing the scanning beam that has been allowed to deflect and scan by the deflection device to carry out scanning on the image-bearing body with a constant velocity.

6. The optical scanning device as defined in claim 5, wherein said second optical means is provided with an fθ lens for allowing the scanning beam that has been allowed to deflect and scan by the deflection device to carry out scanning on the image-bearing body with a constant velocity.

7. The optical scanning device as defined in claim 3, wherein said second optical means is provided with an fθ lens for allowing the scanning beam that has been allowed to deflect and scan by the deflection device to carry out scanning on the image-bearing body with a constant velocity.

8. The optical scanning device as defined in claim 3, wherein said deflection device is placed with the first support face being horizontally placed and with a pivotal shaft in the deflection device being placed perpendicularly to the first support face.

9. The optical scanning device as defined in claim 1, further comprising:

light-directing means for directing the scanning beam onto the image-bearing body, installed in an inner space between the support bodies.

10. The optical scanning device as defined in claim 9, wherein the light-directing means is placed so as to be adjustable in its position.

11. The optical scanning device as defined in claim 9, wherein the light-directing means is a cylinder mirror.

12. An image-forming apparatus for outputting an image onto an image output medium by means of a laser optical scan recording process in accordance with image information, comprising:

an optical scanning device for forming an electrostatic latent image on an image-bearing body with scanning beam released from a light source; and a developing device for carrying out a developing process on the image output medium based upon the electrostatic latent image formed on the optical scanning device, said optical scanning device comprising:

a support body having a plurality of supporting faces;

first and second optical means for directing the scanning beam from the light source onto the image-bearing body, the first optical means being installed on a first supporting face of the support body, the second optical means being installed on a second supporting face adjacent to the first supporting face; and light transmitting means for transmitting the scanning beam from the first optical means to the second optical means, installed in the vicinity of a ridge portion between the first supporting face and the second supporting face.

13. The image-forming apparatus as defined in claim 12, wherein a plurality of the optical scanning devices are installed, and placed in parallel with each other.

14. The image-forming apparatus as defined in claim 13, wherein the respective optical scanning devices form electrostatic latent images of images based upon data corresponding to respectively different color components in image information.

15. The image-forming apparatus as defined in claim 12, further comprising:

light-directing means for directing the scanning beam onto the image-bearing body, installed in an inner space between the support bodies.

16. The image-forming apparatus as defined in claim 15, wherein the light-directing means is placed so as to be adjustable in its position.

17. The image-forming apparatus as defined in claim 12, wherein the light transmitting means is a reflection mirror.

18. The image-forming apparatus as defined in claim 12, wherein said first optical means has a deflection device for allowing the scanning beam from the light source to deflect and scan with a constant angular velocity.

19. The image-forming apparatus as defined in claim 18, wherein the deflection means has a polygon mirror and a driving motor for rotatively driving the polygon mirror.

20. The image-forming apparatus as defined in claim 18, wherein said first optical means is further provided with a θ lens for allowing the scanning beam that has been allowed to deflect and scan by the deflection device to carry out scanning on the image-bearing body with a constant velocity.

21. The image-forming apparatus as defined in claim 20, wherein said second optical means is provided with an fθ lens for allowing the scanning beam that has been allowed to deflect and scan by the deflection device to carry out scanning on the image-bearing body with a constant velocity.

22. The image-forming apparatus as defined in claim 18, wherein said second optical means is provided with an fθ lens for allowing the scanning beam that has been allowed to deflect and scan by the deflection device to carry out scanning on the image-bearing body with a constant velocity.

23. The image-forming apparatus as defined in claim 18, wherein said deflection device is placed with the first support face being horizontally placed and with a pivotal shaft in the deflection device being placed perpendicularly to the first support face.

24. The image-forming apparatus as defined in claim 12, further comprising:

image-reading means for reading an image of an original document as image data.

\* \* \* \* \*